United States Patent
Shimomura (10) Patent No.: US 6,761,621 B2
(45) Date of Patent: Jul. 13, 2004

(54) GEAR AND METHOD OF MANUFACTURING GEAR

(75) Inventor: Mitsuhiko Shimomura, Nagoya (JP)

(73) Assignee: O-Oka Corporation, Aichi-ken (JP)

( * ) Notice: Subject to any disclaimer, the term of this patent is extended or adjusted under 35 U.S.C. 154(b) by 0 days.

(21) Appl. No.: 09/515,469

(22) Filed: Feb. 29, 2000

(65) Prior Publication Data

US 2003/0022601 A1 Jan. 30, 2003

(30) Foreign Application Priority Data

Dec. 22, 1999 (JP) .......................................... 11-365361

(51) Int. Cl.$^7$ .................................................. B24B 1/00
(52) U.S. Cl. ........................ 451/47; 451/54; 29/893.35; 409/66
(58) Field of Search ................................ 148/219, 226; 29/893.34, 893.36, 893.3, 893.35, 893.37; 72/364; 451/47, 48, 54; 409/66, 75–77

(56) References Cited

U.S. PATENT DOCUMENTS

| | | | | |
|---|---|---|---|---|
| 4,949,456 A | * | 8/1990 | Kovach et al. | .......... 29/893.35 |
| 5,516,376 A | * | 5/1996 | Tsukamoto et al. | .......... 148/586 |
| 5,718,774 A | * | 2/1998 | Tukamoto et al. | .......... 148/219 |

FOREIGN PATENT DOCUMENTS

JP 2832325 8/1994

* cited by examiner

*Primary Examiner*—Timothy V. Eley
(74) *Attorney, Agent, or Firm*—Pearson & Pearson, LLP (57) ABSTRACT

To provide a gear having high strength and high dimension precision. A cut material is heated in an anti-oxidation atmosphere. Then, a form including gear teeth and having a nearly completed shape is formed from the upset material at one time by hot forging. The form undergoes gear grinding, whereby a finished product is obtained. The form has a curved surface previously formed at a corner along a tooth trace of a tooth flank.

6 Claims, 7 Drawing Sheets

GEAR AND METHOD OF MANUFACTURING GEAR

BACKGROUND OF THE INVENTION

1. Field of the Invention

The invention relates to a high-precision gear which is suitably available for a transmission for transmitting high torque for an automobile, an industrial machine or the like, for example, and a method of manufacturing a gear.

2. Description of the Related Art

Figures 7A, 7B:
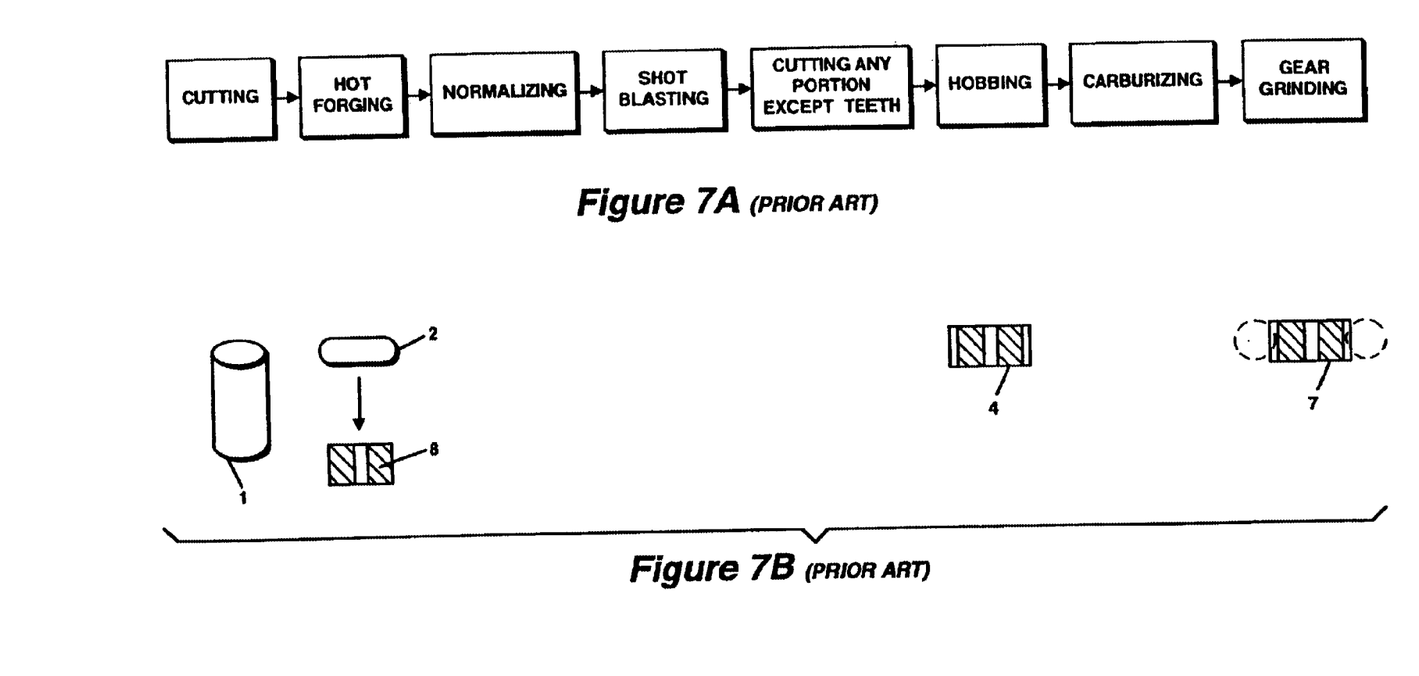
FIG. 7A is a flow chart of the method of manufacturing the gear of the related art.
FIG. 7B graphically illustrates the material stages of forming a gear during the related art manufacturing method of FIG. 7A.

In general, a gear for use in a transmission or the like has been heretofore manufactured as shown in FIG. 7. A cut material 1 is upset. Then, a blank 8 with no gear tooth, which is formed by using forging means, is cut (hobbed) in the circumferential surface thereof, whereby a form 4 with gear teeth is obtained. Then, the form 4 is gear-ground, whereby a finished product 7 is obtained. The cut gear thus formed has a flow line that is cut off by cutting, and thus the gear teeth decrease in strength. A solution such as a careful selection of the material or shot peening is consequently required.

An attempt has been therefore made to simultaneously form the gear teeth together with the blank by using the forging means, i.e., to obtain the so-called form with gear teeth. This form with gear teeth is proceeding toward practical use.

Forging means generally include hot forging and cold forging. Hot forgings are prone to change in dimension due to the wearing away of a die because the material or the die considerably changes in temperature. Cold forgings are susceptible to a variation in stress of the die or the material during pressurization. Thus, the gear teeth, which are formed simultaneously with a formation of the blank, vary widely. Moreover, the gear teeth are less precise.

Therefore, such gear teeth must be cut so as to improve their precision. More particularly, the product requiring high precision is surface-finished by additional gear grinding.

Accordingly, the gear requiring the high precision needs other processes such as the cutting and the gear grinding (polishing) in addition to forging.

Recently, a streamlining has been increasingly demanded. In the field of the manufacturing of the above-mentioned gear, a further reduction of the process is desired for the manufacturing of the gear which has been hitherto able to be manufactured by at least the forging, the cutting, the gear grinding and so on.

However, when the cutting is eliminated for this purpose, the gear grinding must compensate for the process equivalent to the eliminated cutting. Thus, the process is eliminated, but the time required to work considerably increases and consequently workability decreases. When one depth of cut is increased so as to make an attempt to reduce the working time, a problem arises, that is, the attempt causes damage to a grinding wheel.

SUMMARY OF THE INVENTION

It is an object of the invention to reduce processes and to streamline the manufacturing of a gear by increasing one depth of cut for gear grinding. A gear is formed by gear-grinding a form with gear teeth formed by forging means without cutting the form. A method of manufacturing a gear comprises: a forging step of forming a form with gear teeth, the form having a curved surface on which a corner along a tooth trace of a tooth flank is formed; and a gear grinding step of grinding the gear teeth of the form. Desirably, the gear is formed by gear-grinding a form with gear teeth without cutting the form, and the form has a curved surface on which a corner along a tooth trace of a tooth flank is formed by forging means.

Moreover, in the gear, hot forging can be used as the forging means. In the method of manufacturing the gear, the forging step can be hot forging.

BRIEF DESCRIPTION OF THE DRAWINGS

FIGS. 5A to 5C are enlarged views of a modification of the gear tooth, and FIG. 5A is a sectional end view taken on line B—B;

DETAILED DESCRIPTION OF THE PREFERRED EMBODIMENTS

Preferred embodiment of a method of manufacturing a forged gear according to the invention, which has precision maximized by adding other processes to the method, will be described with reference to the accompanying drawings. However, FIG. 7A shows a flow chart of the method of manufacturing the gear of the related art. FIG. 7B shows the material stages of forming a gear during the prior art manufacturing method of FIG. 7A.

Figure 1A:
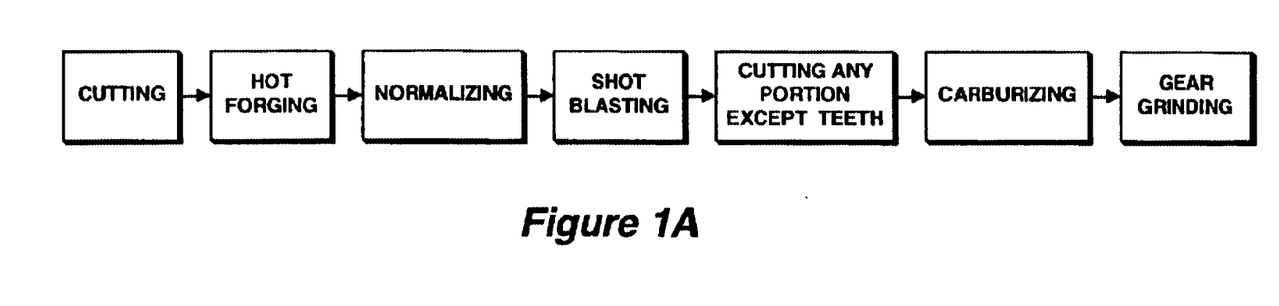
FIG. 1A is a flow chart of a method of manufacturing a gear according to the invention.
Figure 1B:
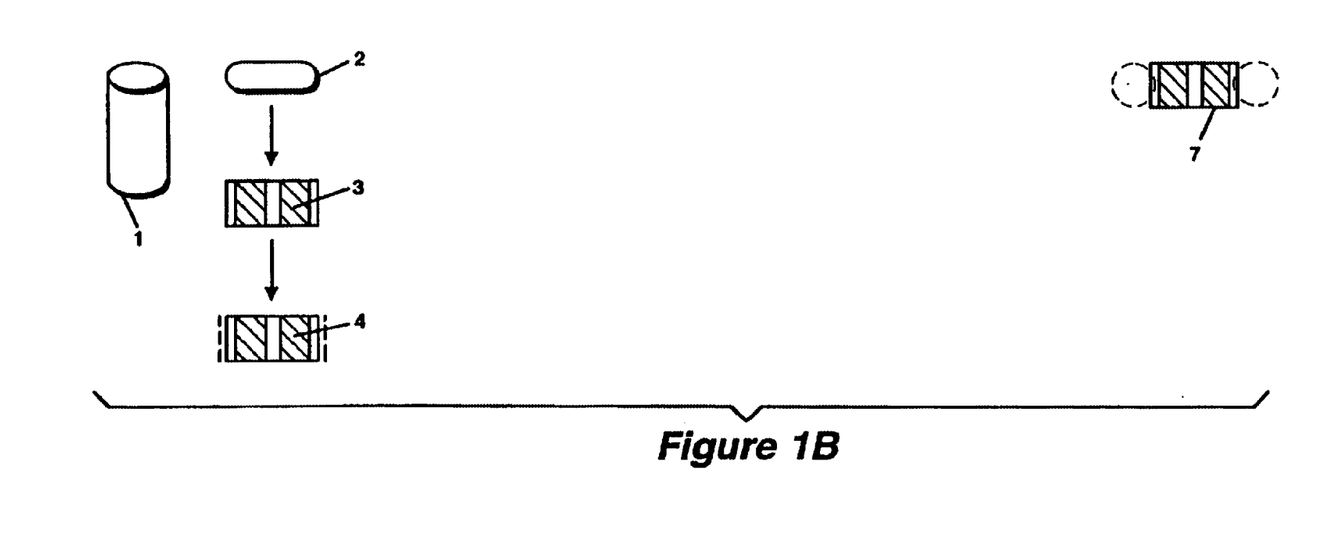
FIG. 1B graphically illustrates the material stages of forming a gear during the manufacturing method of FIG. 1A.

FIG. 1A illustrates a manufacturing process and FIG. 1B shows the material stages of forming a gear during the manufacturing process of FIG. 1A. A first process includes the following processes. In an upsetting process, a cylindrical cut material 1 whose volume is substantially the same as the volume of a finished product is used as a starting material, the cut material is heated in an anti-oxidation atmosphere, and the cut material is upset so as to have an appropriate volume distribution by hot forging. In a rough formation process, an upset material 2 is pressed so as to have a shape (including gear teeth) close to the shape of the finished product. In a finishing process, the precision of each portion of a rough form 3 having the shape close to the shape of the finished product is improved, whereby a form 4 having a nearly completed shape (including the gear teeth) is formed.

"The use of the word "cut" or "cutting" herein means to penetrate with a sharp edge or to separate into parts with or as if with a sharp edged instrument." The use of the word "grind" or "grinding" herein means to crush, pulverize or powder by friction especially by rubbing between two hard surfaces, to shape, sharpen, or refine with friction such as to grind a gear tooth.

In the above-mentioned hot forging, the gear teeth are formed simultaneously with the formation of a blank. Thus, a flow line of the gear teeth formed around the blank is continuous, and thus the gear teeth increase in strength compared with the gear teeth formed by machining. Therefore, a careful selection of the material, shot peening or the like is not required. Consequently, productivity becomes excellent and yield also improves.

Figure 2A:
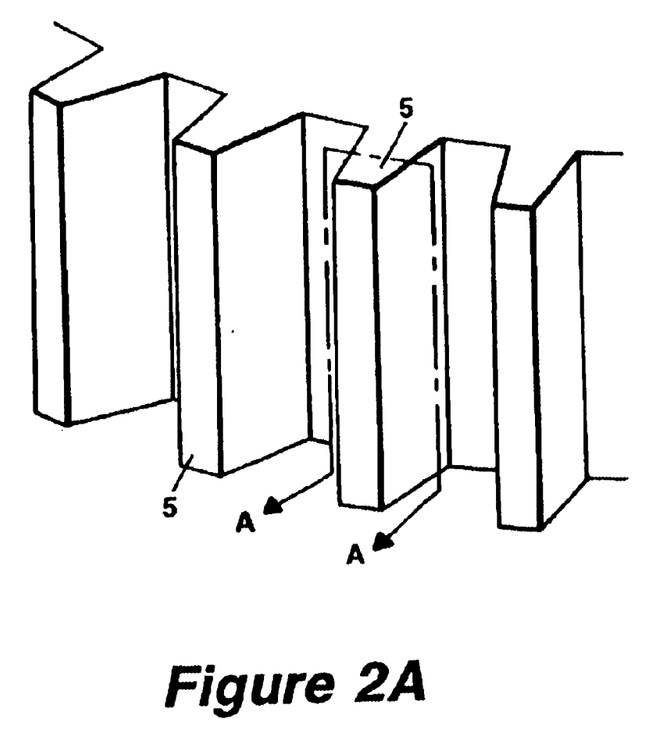
FIGS. 2A and 2B are an enlarged view of the gear teeth and a sectional end view taken on line A—A, respectively.
Figure 2B:
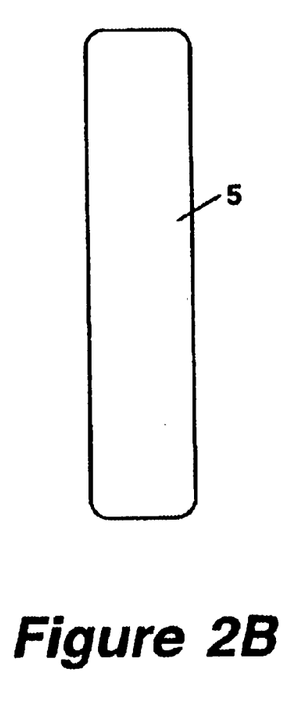

The above-mentioned form has gear teeth 5, each of which has a curved surface R having a curvature radius of about 0.2 mm at each corner along a tooth trace of a tooth flank, as illustrated in FIGS. 2A and 2B.

The technique of anti-oxidation normalizing is adopted to heat-treat the form having the nearly completed shape obtained by the above-mentioned hot forging.

The heat-treated material undergoes surface treatment: the removal of scale on the material surface resulting from shot blasting; and cutting for giving a predetermined dimension to an end surface, an inner circumferential surface of a hole or the like except the portion having the gear teeth.

In the above-mentioned shot blasting, during the above-described hot forging, both of the heating of the material and the normalizing take place in the anti-oxidation atmosphere, thereby preventing the decarburization of the surface and the occurrence of the scale and thus reducing a thickness of the scale to be removed.

Thus, fine particles (having a particle diameter of about 0.5 mm, for example) can be used as shot particles. As a result, roughness of the finished surface is reduced, and thus a narrow margin for grinding is sufficient for the following grinding. Therefore, the material is little wasted and thus the yield is high.

Then, carburizing takes place. Finally, gear grinding takes place, whereby a finished product 7 is obtained.

After the surface treatment, the form having the nearly completed shape formed by the above-mentioned forging has the curved surface having a curvature radius of at least about 0.2 mm at each corner along the tooth trace of the tooth flank.

Figure 3A:
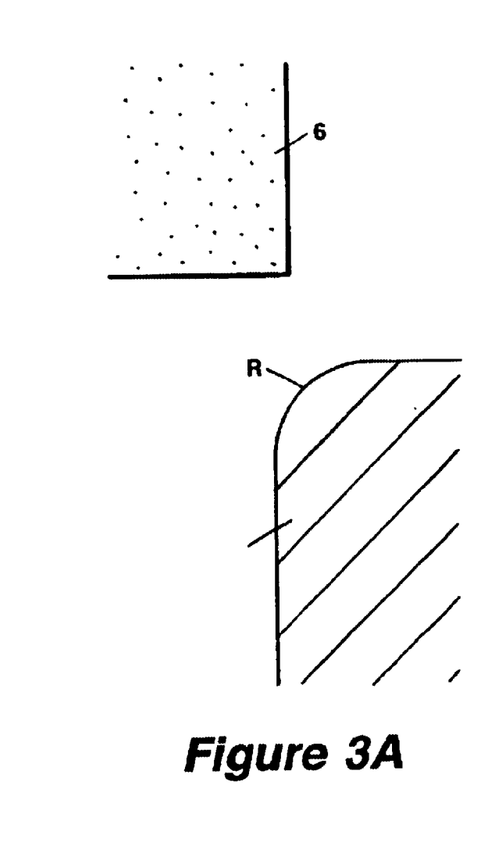
FIGS. 3A to 3C illustrate gear grinding.
Figure 3B:
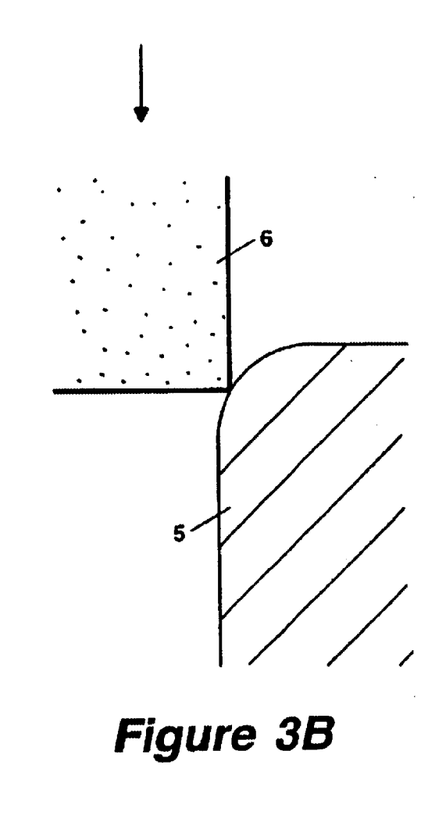
Figure 3C:
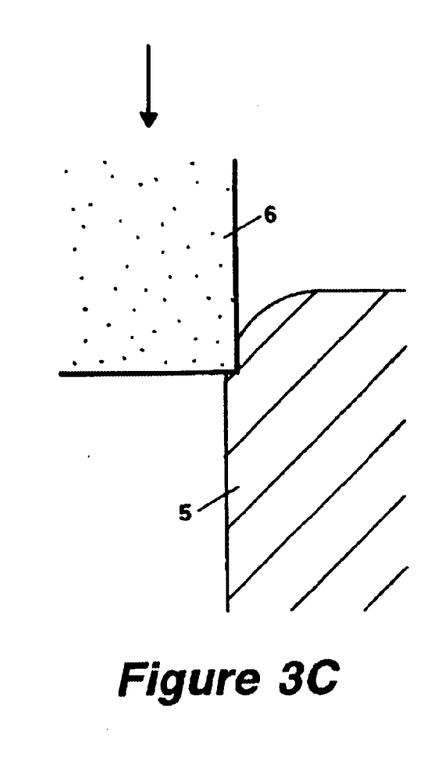

When such a form is gear-ground, a contact of a grinding wheel 6 with the curved surface R of the gear tooth 5 is gradually increased as shown in FIGS. 3A to 3C and thus the grinding wheel 6 is not abruptly shocked. Thus, even if the gear tooth 5 is deeply penetrated at one time without repeating many penetrations with a slight depth of penetration, the grinding wheel is not damaged. When the depth of penetration is about 0.2 mm, a smooth surface can be finished by a few reciprocating motions of the grinding wheel. Moreover, the depth of penetration of about 0.2 mm satisfies a depth of carburizing required to ensure hardness.

On the other hand, a cavity and a punch of a forging apparatus do not have an acute angle at the portion thereof corresponding to the corner along the tooth trace of the tooth flank of the form. This not only prevents a local temperature rise caused by friction during pressurization but also reduces wear and thus prevents damage to a die due to stress concentration.

Figure 4A:
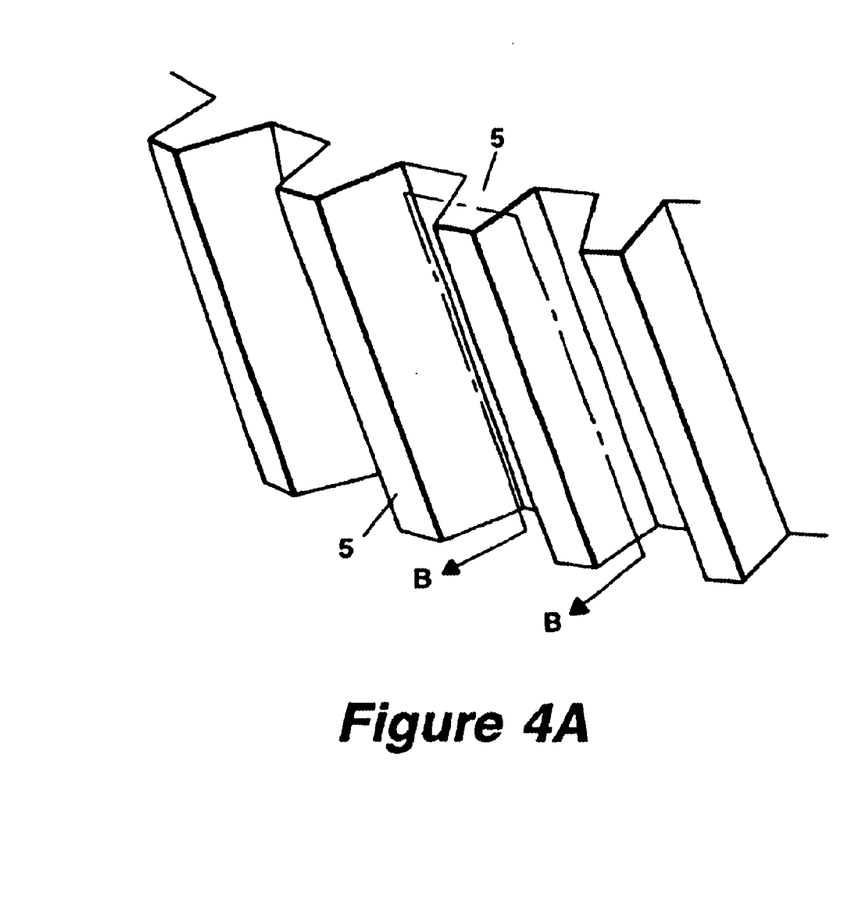
FIGS. 4A and 4B illustrate the gear teeth of helical teeth.
Figure 4B:
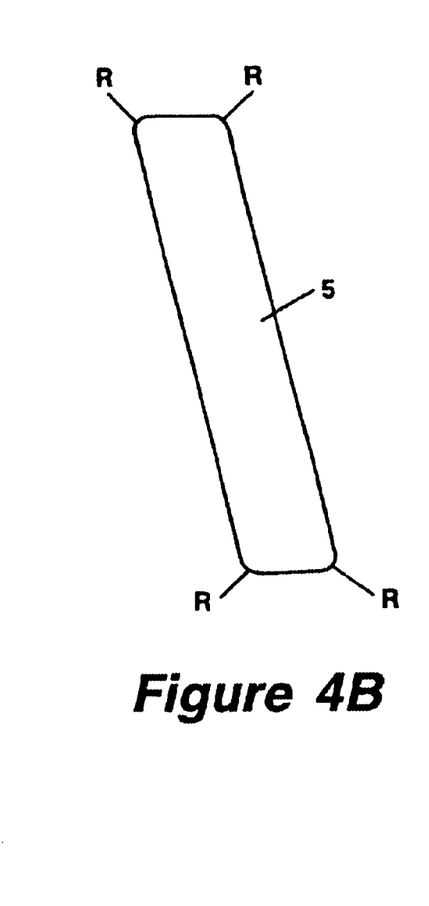

The gear tooth formed by the above-described forging includes not only a spur tooth but also a helical tooth. Also in the case of the helical tooth, the curved surface R is formed at each corner along the tooth trace of the tooth flank of the gear tooth 5 as shown in FIGS. 4A and 4B.

Figures 5A, 5B:
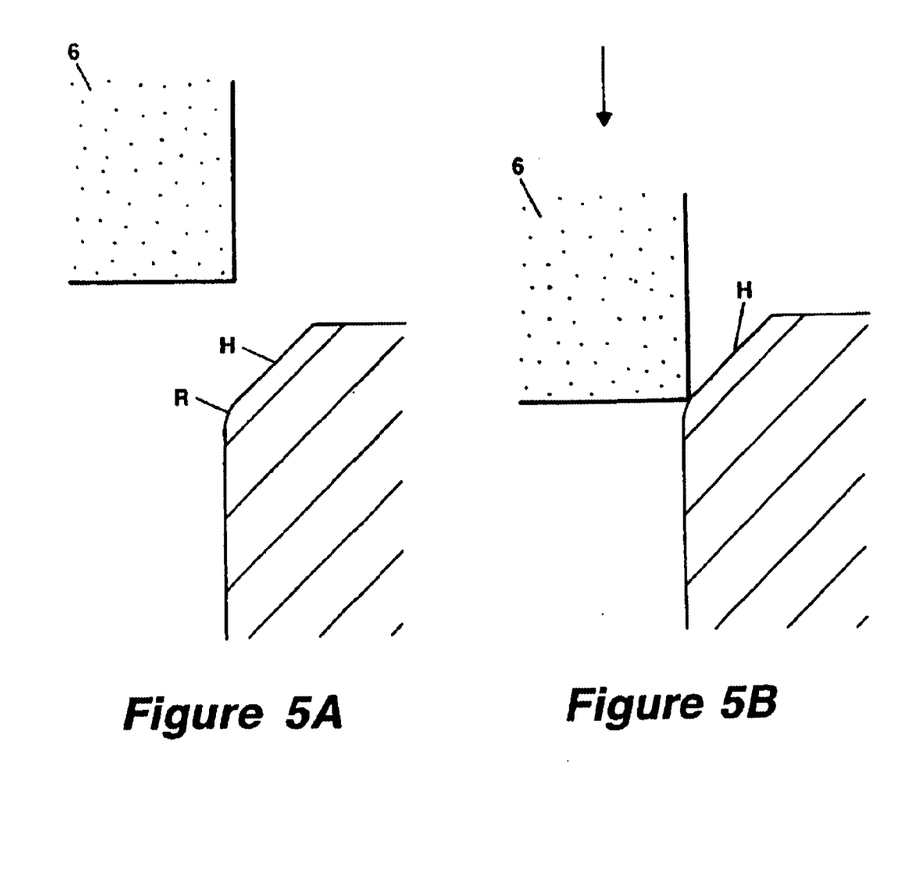
Figure 5C:
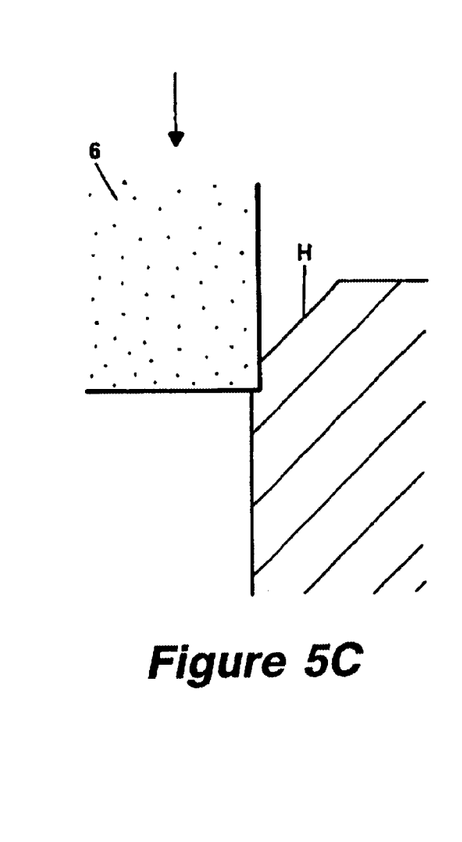

Moreover, many gears to be supplied as the product require chamfering at each corner along the tooth trace of the tooth flank. Thus, the trouble to cut a chamfer is taken. However, for such a gear, a chamfer H is previously formed by the forging so as to be continuously integrated with the curved surface R, as shown in FIGS. 5A to 5C. Thus, similarly to the above-described embodiment, a wide margin for grinding can be provided for the gear grinding using the grinding wheel 6. Moreover, the chamfer H remains after the gear grinding, and thus the cutting for the chamfering is not needed.

The apparatus, in which at least the die or an ejector is rotatable and removable while being rotated as disclosed in Japanese Patent No. 2832325, for example, is suitably used to form the helical tooth.

Moreover, the gear to be formed is applied to various forms such as the gear having a boss on at least one side surface or the gear having a dog tooth formed integrally with the boss.

In the above-mentioned embodiment, the method, which includes additional processes such as the shot blasting for removing the scale on the material surface and the cutting for giving a predetermined dimension to the end surface, the inner circumferential surface of the hole or the like except the portion having the gear teeth, has been described. However, these processes may be eliminated. Alternatively, only the hot forging, only cold forging or both of the hot forging and the cold forging can be used as the forging means.

Figure 6A:
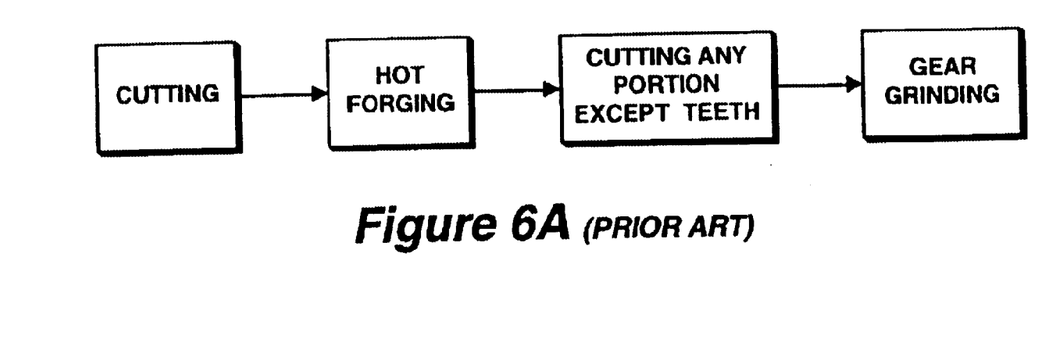
FIG. 6A is a flow chart of the simplest manufacturing method.
Figure 6B:
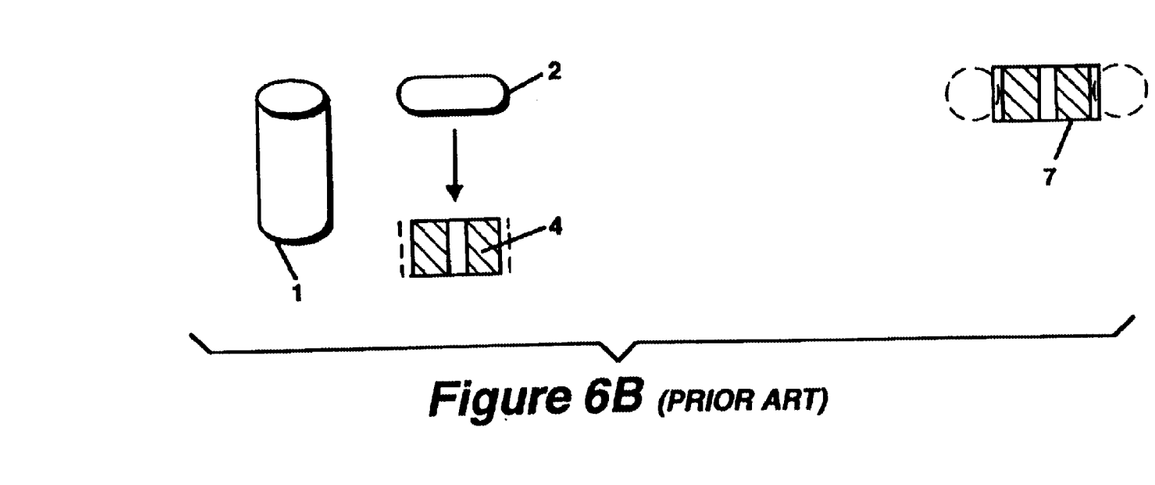
FIG. 6B graphically illustrates the material stages of forming a gear during the manufacturing method of FIG. 6A.

The simplest embodiment of the manufacturing method will be described with reference to FIG. 6A, and FIG. 6B shows the material stages of forming the gear during the manufacturing method of FIG. 6A.

The same reference numerals and symbols as those of the above-described first embodiment are used.

First, the cylindrical cut material 1 whose volume is substantially the same as the volume of the finished product is used as the starting material. The cut material is heated and upset in the anti-oxidation atmosphere. The form 4 having the nearly completed shape (including the gear teeth) is formed at one time by the hot forging.

The form 4 undergoes the cutting of any portion other than the teeth and the carburizing. Then, a second process, namely, the gear grinding takes place, whereby the finished product is obtained.

In this manner, two processes alone can complete the high-precision gear.

Moreover, in this embodiment, the hot forging is adopted as the forging, whereby the product can be inexpensively manufactured and a large-sized product having a large module can be also manufactured.

In any embodiment, the manufactured gear is formed by the forging. Therefore, the gear has the gear teeth having a continuous flow line and high strength. Moreover, these gear teeth have extremely high surface precision because they are gear-ground.

According to the invention, the high-precision gear can be mass-produced by a small number of processes.

More particularly, when the gear grinding is applied to the form with gear teeth having the corner on the curved surface, the grinding wheel starts the grinding while gradually increasing a contact surface with the tooth flank from a contact point of the curved surface. Thus, even if a wide margin for cutting is provided, the grinding wheel is little shocked at the time of the start of the grinding and therefore the grinding wheel is not damaged.

Moreover, the hot forging is utilized, whereby the product can be inexpensively manufactured and the large-sized product having the large module can be also manufactured.

What is claimed is:

1. A method of manufacturing a gear comprising the steps of:

forming gear teeth on a form by forging said form having a curved surface on which a corner along a tooth trace of a tooth flank is formed; and grinding said gear teeth of said form to a precision finish.

2. The method of manufacturing a gear according to claim 1 wherein said step of forging includes hot forging.

3. The method of manufacturing a gear according to claim 1 wherein said step of forging includes cold forging.

4. A method of manufacturing a gear comprising:

a forging step of forming a form with gear teeth, said form having a curved surface on which a corner along a tooth trace of a tooth flank is formed; and a finishing step of only grinding said gear teeth of said form.

5. The gear made by the method as recited in claim 4 wherein said means for forging comprises hot forging.

6. The gear made by the method as recited in claim 4 wherein said means for forging comprises cold forging.

* * * * *